United States Patent
DeFrancesco et al.

(10) Patent No.: US 10,457,552 B2
(45) Date of Patent: Oct. 29, 2019

(54) FLOW SENSING OZONE CONVERTER

(71) Applicant: HAMILTON SUNDSTRAND CORPORATION, Windsor Locks, CT (US)

(72) Inventors: Gregory L. DeFrancesco, Simsbury, CT (US); Donald E. Army, Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 261 days.

(21) Appl. No.: 15/417,679

(22) Filed: Jan. 27, 2017

(65) Prior Publication Data

US 2018/0215620 A1   Aug. 2, 2018

(51) Int. Cl.
| | |
|---|---|
| *C01B 13/02* | (2006.01) |
| *B01D 53/86* | (2006.01) |
| *B01J 7/00* | (2006.01) |
| *B64D 13/06* | (2006.01) |
| *G01F 1/34* | (2006.01) |

(52) U.S. Cl.
CPC ...... *C01B 13/0203* (2013.01); *B01D 53/8675* (2013.01); *B01D 53/8696* (2013.01); *B01J 7/00* (2013.01); *B64D 13/06* (2013.01); *G01F 1/34* (2013.01); *B01D 2259/4575* (2013.01); *B64D 2013/0685* (2013.01); *Y02T 50/44* (2013.01)

(58) Field of Classification Search
CPC ............ C01B 13/0203; B01D 53/8675
See application file for complete search history.

(56) References Cited

U.S. PATENT DOCUMENTS

| | | | |
|---|---|---|---|
| 6,688,184 B2 | 2/2004 | Army, Jr. et al. | |
| 8,511,179 B2 | 8/2013 | Kelnhofer et al. | |
| 9,133,028 B2 | 9/2015 | Army et al. | |
| 9,365,293 B2 | 6/2016 | Steinmaier et al. | |
| 2014/0045415 A1 | 2/2014 | Mansfield-Marcoux et al. | |
| 2014/0308171 A1* | 10/2014 | Army | C01B 13/0203 422/120 |
| 2017/0045255 A1* | 2/2017 | Karamanos | G05D 7/0635 |
| 2017/0283083 A1* | 10/2017 | Behbahani-Pour | B64D 25/00 |
| 2018/0328246 A1* | 11/2018 | Mikami | F01N 3/0814 |

FOREIGN PATENT DOCUMENTS

| | | |
|---|---|---|
| EP | 2792400 A1 | 10/2014 |
| FR | 2357297 A1 | 2/1978 |
| FR | 3011819 A1 | 4/2015 |
| WO | 9403265 A1 | 2/1994 |
| WO | 2015189593 A1 | 12/2015 |

OTHER PUBLICATIONS

European Search Report for European Application No. 18153958.6 dated Jun. 4, 2018, 5 pages.

* cited by examiner

*Primary Examiner* — Kevin Joyner
(74) *Attorney, Agent, or Firm* — Cantor Colburn LLP

(57) ABSTRACT

A flow sensing ozone converter includes an inlet housing, an outlet housing, and a central housing. The inlet housing defines a first pressure port. The outlet housing defines a second pressure port. The central housing extends between a second end of the inlet housing and a first end of the outlet housing.

22 Claims, 5 Drawing Sheets

FLOW SENSING OZONE CONVERTER

BACKGROUND

Exemplary embodiments pertain to the art of ozone converters for use with an aircraft environmental control system.

Aircraft are commonly provided with environmental control system that supplies pressurized air to the cabin and other areas of the aircraft. Ambient air that is received by the environment control system may contain ozone ($O_3$). An ozone converter is provided to convert the ozone to oxygen ($O_2$). The environmental control system may sense flow in order to comply with cabin in-flow requirements. Devices that sense the pressure differential from an inlet to a throat of a venturi along with measurements of absolute pressure and temperature may be employed to accomplish flow sensing.

BRIEF DESCRIPTION

Disclosed is a flow sensing ozone converter for an environmental control system. The flow sensing ozone converter includes an inlet housing, an outlet housing, and a central housing. The inlet housing has an inlet housing first end, an inlet extending from the inlet housing first end, and an inlet housing second end. The inlet housing defines a first pressure port. The outlet housing has an outlet housing first end, an outlet housing second end, and an outlet extending from the outlet housing second end. The outlet housing defines a second pressure port. The central housing extends between the inlet housing second end and the outlet housing first end.

Also disclosed is an environmental control system. The environmental control system includes a flow sensing ozone converter having an inlet housing, an outlet housing, and a central housing. The inlet housing has an inlet housing first end and an inlet housing second end. The inlet housing defines a first pressure port disposed proximate the inlet housing first end and defines a first mounting feature disposed proximate the inlet housing second end. The outlet housing has an outlet housing first end and an outlet housing second end. The outlet housing defines a second pressure port disposed proximate the outlet housing second end and defines a second mounting feature disposed proximate the outlet housing first end. The central housing extends between the inlet housing second end and the outlet housing first end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
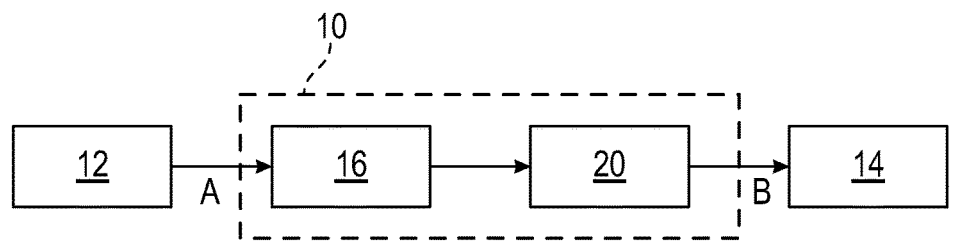
FIG. 1 is a block diagram illustrating an environmental control system.

Referring to FIG. 1, an environmental control system 10 for an aircraft is shown. The environmental control system 10 receives input air, A, from an input air source 12 and provides conditioned output air, B, to a location 14. The input air, A, may be bleed air from a gas turbine engine compressor or may be ambient air received from another location of the aircraft. The location 14 may be a passenger compartment or other location of the aircraft. The environmental control system 10 includes an environmental parameter adjusting unit 16. The environmental parameter adjusting unit 16 receives the input air, A, and adjusts an environmental parameter such as pressure, temperature, humidity, or the like.

The environmental control system 10 may further include a flow sensing ozone converter 20. The flow sensing ozone converter 20 may be disposed upstream or downstream of the environmental parameter adjusting unit 16. The flow sensing ozone converter 20 is provided to remove ozone, $O_3$, from the input air, A, such that the conditioned output air, B, that is provided to the location 14 has minimal to no ozone, $O_3$. The flow sensing ozone converter 20 is also configured to provide health monitoring information of the flow sensing ozone converter itself to a control system or monitoring system such that the status or the life of the flow sensing ozone converter 20 may be assessed.

Referring to FIGS. 2-6, the flow sensing ozone converter 20 includes a housing assembly 22, a mounting assembly 24, and a sensor assembly 26.

The housing assembly 22 defines a first pressure port 30, a second pressure port 32, a third pressure port 34, a port 36, and mounting features 38. The housing assembly 22 includes an inlet housing 40, an outlet housing 42, and a central housing 44.

The inlet housing 40 is arranged to receive the input air, A. The inlet housing 40 includes an inlet housing first end 50, an inlet housing second end 52, and an inlet 54. The inlet housing 40 extends between the inlet housing first end 50 and inlet housing second end 52. The inlet housing 40 has a cross-sectional diameter that increases in a direction that extends from the inlet housing first end 50 towards the inlet housing second end 52.

Figure 4:
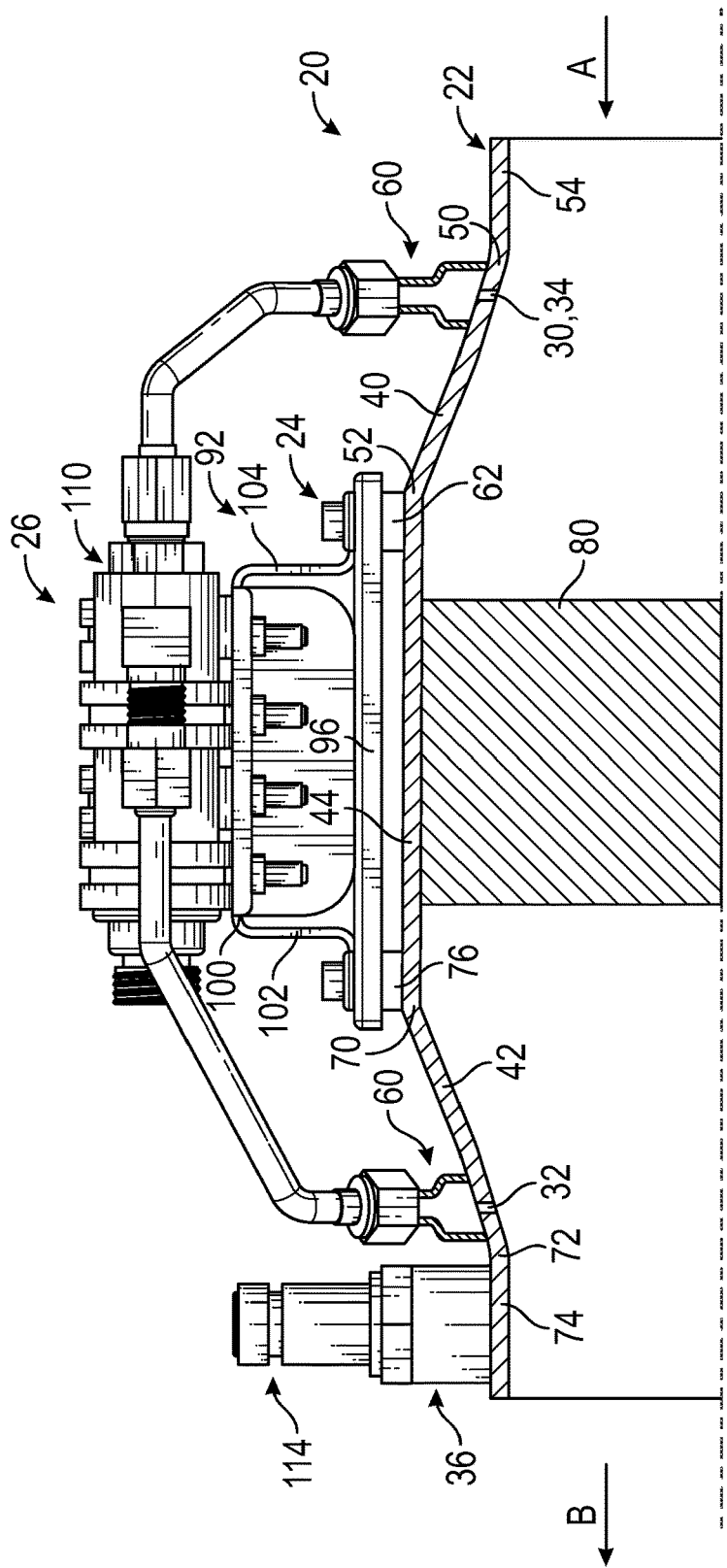
FIG. 4 is a first side view of the ozone converter.
Figure 5:
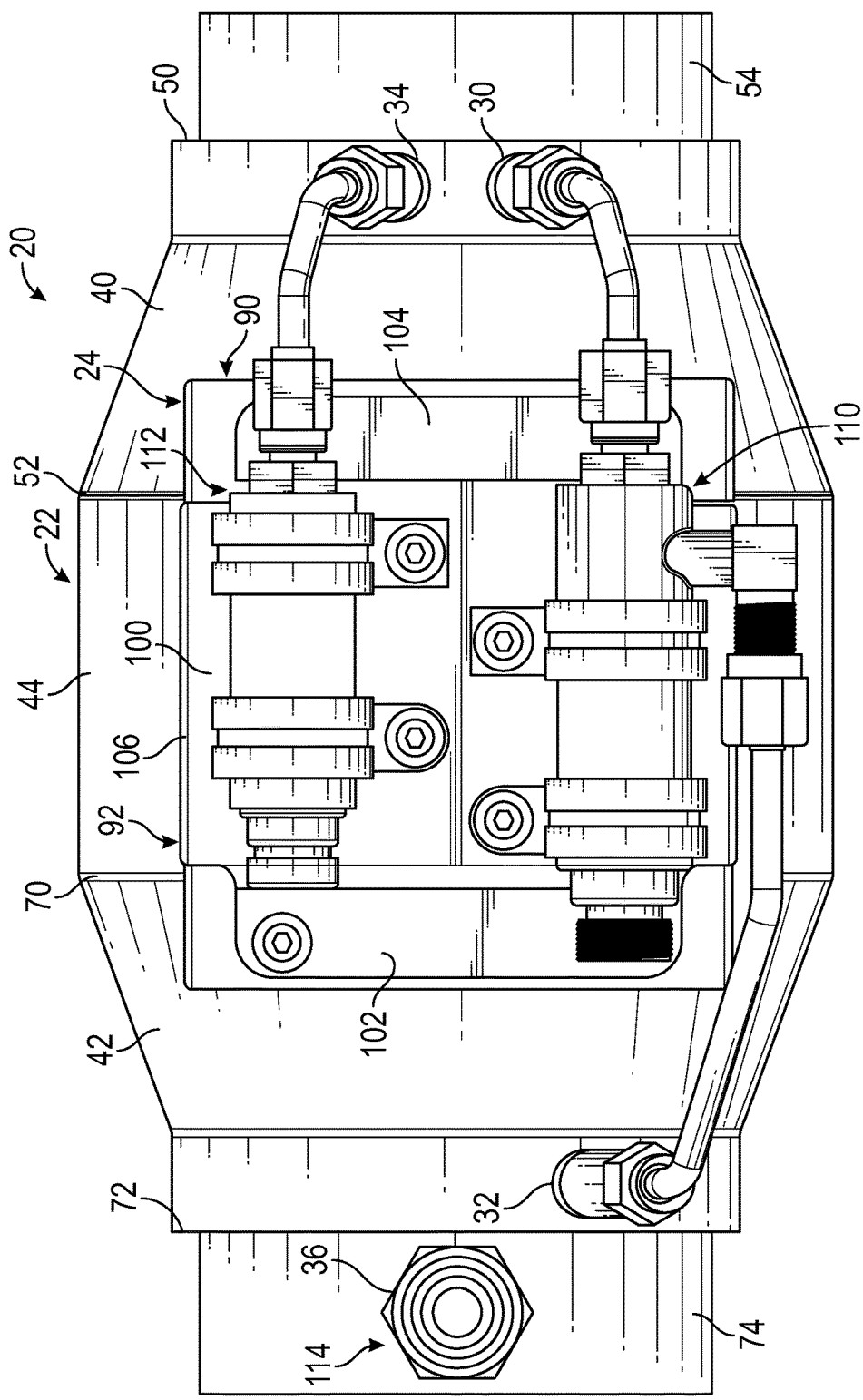
FIG. 5 is a second side view of the ozone converter.

The inlet housing 40 defines the first pressure port 30 and the third pressure port 34. The first pressure port 30 is disposed proximate the inlet housing first end 50. The third pressure port 34 is spaced apart from the first pressure port 30 and is disposed proximate the inlet housing first end 50. As shown in FIG. 4, a piezometer ring 60 may be disposed over or about the first pressure port 30 and the third pressure port 34. The piezometer ring 60 may flare or have an increase diameter disposed proximate the outer surface of the inlet housing 40. The piezometer ring 60 may be wrapped around and operatively connected to the outside diameter of the inlet housing 40.

Figure 3:
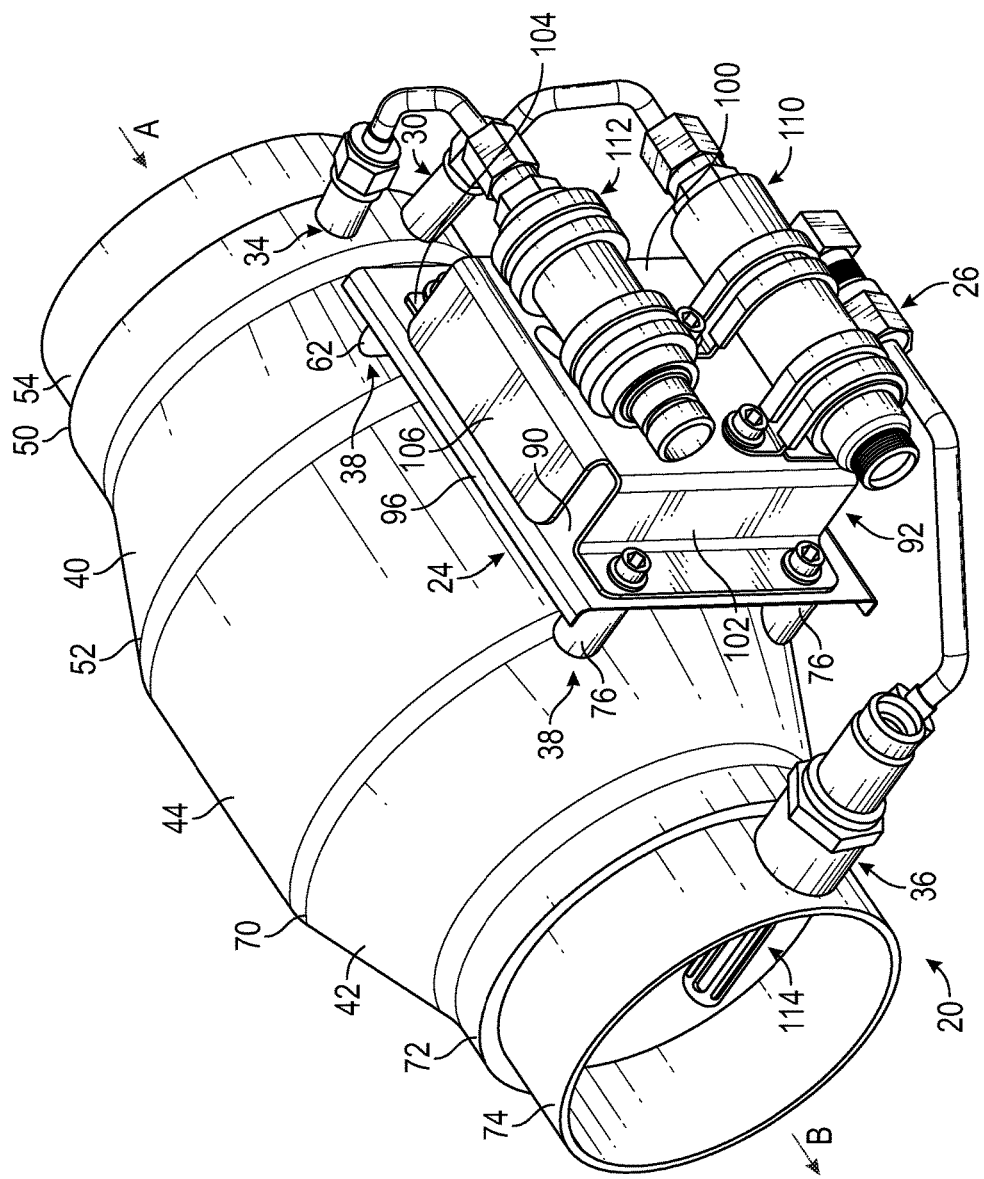
FIG. 3 is a second perspective view of the ozone converter.

A first mounting feature 62 of the mounting features 38 is disposed proximate the inlet housing second end 52, as shown in FIG. 3. Another first mounting feature 62 may be radially spaced apart from the first mounting feature 62. The first mounting feature 62 may extend from the inlet housing 40, such that it is configured as a standoff. In at least one embodiment, the first mounting feature 62 may extend into or may be completely defined by the inlet housing 40 such that it is flush with the outer surface of the inlet housing 40. In further embodiments, the first mounting feature 62 may be defined by the central housing 44.

The inlet 54 extends from the inlet housing first end 50. The inlet 54 has a cross-sectional diameter that may be less than the cross-sectional diameter of the inlet housing first end 50. The cross-sectional diameter of the inlet 54 is substantially constant. In at least one embodiment, the inlet 54 defines the first pressure port 30 and the third pressure port 34 that are each disposed proximate the inlet housing first end 50. In at least one embodiment, an end of the inlet 54 defines a mounting flange to aid in attaching the inlet housing 40 to an adjacent component of the environmental control system 10.

The outlet housing 42 is spaced apart from and is disposed opposite the inlet housing 40. The outlet housing 42 is arranged to exhaust the output air, B. The outlet housing 42 includes an outlet housing first end 70, an outlet housing second end 72, and an outlet 74. The outlet housing 42 extends between the outlet housing first end 70 and the outlet housing second end 72. The outlet housing 42 has a cross-sectional diameter that decreases in a direction that extends from the outlet housing first end 70 towards the outlet housing second end 72.

The outlet housing 42 defines the second pressure port 32 that is disposed proximate the outlet housing second end 72. As shown in FIG. 4, a piezometer ring 60 may be disposed over or about the second pressure port 32. The piezometer ring 60 may flare or have an increased diameter that is disposed proximate the outer surface of the outlet housing 42. The piezometer ring 60 may be wrapped around and may be operatively connected to the outside diameter of the outlet housing 42.

A second mounting feature 76 of the mounting features 38 is disposed proximate the outlet housing first end 70. Another second mounting feature 76 may be radially spaced apart from the second mounting feature 76. The second mounting feature 76 may extend from the outlet housing 42, such that it is configured as a standoff. In at least one embodiment, the second mounting feature 76 may extend into or may be completely defined by the outlet housing 42 such that it is flush with the outer surface of the outlet housing 42. In further embodiments, the second mounting feature 76 may be defined by the central housing 44.

The outlet 74 extends from the outlet housing second end 72. The outlet 74 has a cross-sectional diameter that may be less than the cross-sectional diameter of the outlet housing second end 72. The cross-sectional diameter of the outlet 74 is substantially constant. In at least one embodiment, the outlet 74 defines the port 36 that is disposed proximate the outlet housing second end 72. In at least one embodiment, an end of the outlet 74 defines a mounting flange to aid in attaching the outlet housing 42 to an adjacent component of the environmental control system 10.

The central housing 44 extends between the inlet housing 40 and the outlet housing 42. More specifically, the central housing 44 extends between the inlet housing second end 52 and the outlet housing first end 70. The central housing 44 has a substantially constant cross-sectional diameter. The cross-sectional diameter of the central housing 44 may be substantially equal to the cross-sectional diameter of the inlet housing second end 52 and the outlet housing first end 70. The inlet housing 40 and outlet housing 42 may be integrally formed with the central housing 44. In at least one embodiment, the inlet housing 40 and outlet housing 42 may be removably coupled to the central housing 44 by coupling mechanisms, such as a flange, a v-band flange, or the like.

Referring to FIG. 4, the central housing 44 is arranged to receive a core 80. The core 80 is a catalytic element that converts some or all of the ozone ($O_3$) from the inlet air, A, to oxygen ($O_2$) passing through the flow sensing ozone converter 20, to provide a safe level of ozone ($O_3$) in the outlet air, B. The core 80 may be formed as a honeycomb lattice or a spiral wound core or any other configuration capable of removing ozone from an air flow. The core 80 may be sized such that it is completely disposed within the central housing 44. In at least one embodiment, the core 80 may be sized such that at least a portion of the core 80 extends into the inlet housing 40. In at least one embodiment, the core 80 may be sized such that at least a portion of the core 80 extends into the outlet housing 42. In further embodiments, the core 80 may be sized such that at least a portion of the core 80 extends into both of the inlet housing 40 and the outlet housing 42.

Figure 2:
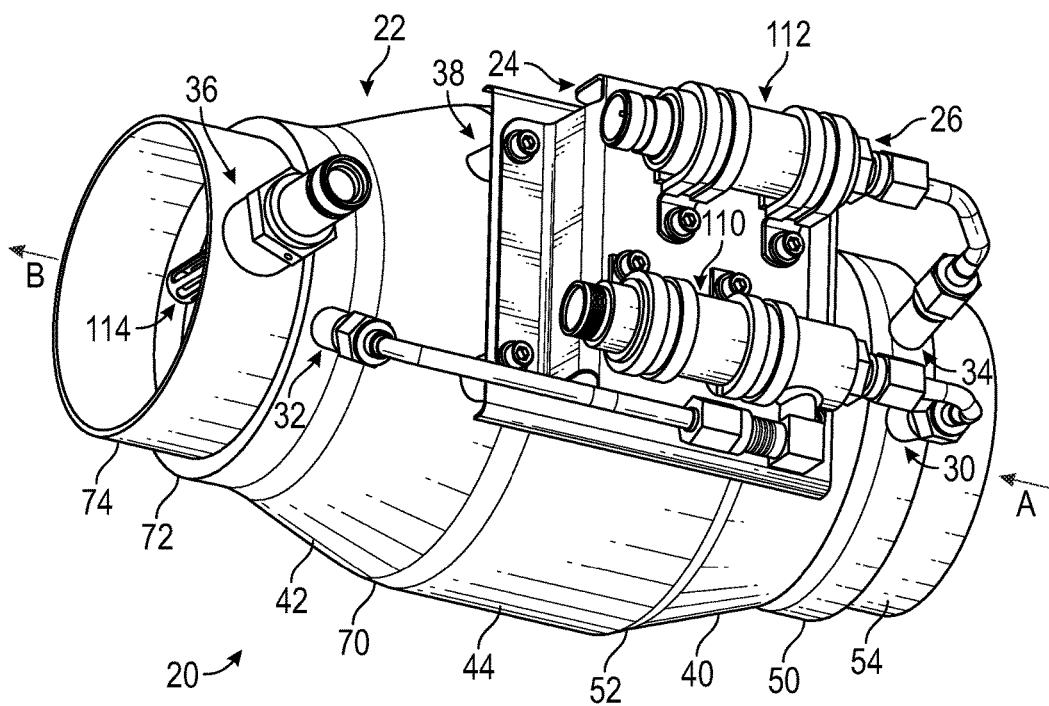
FIG. 2 is a first perspective view of an ozone converter.
Figure 6:
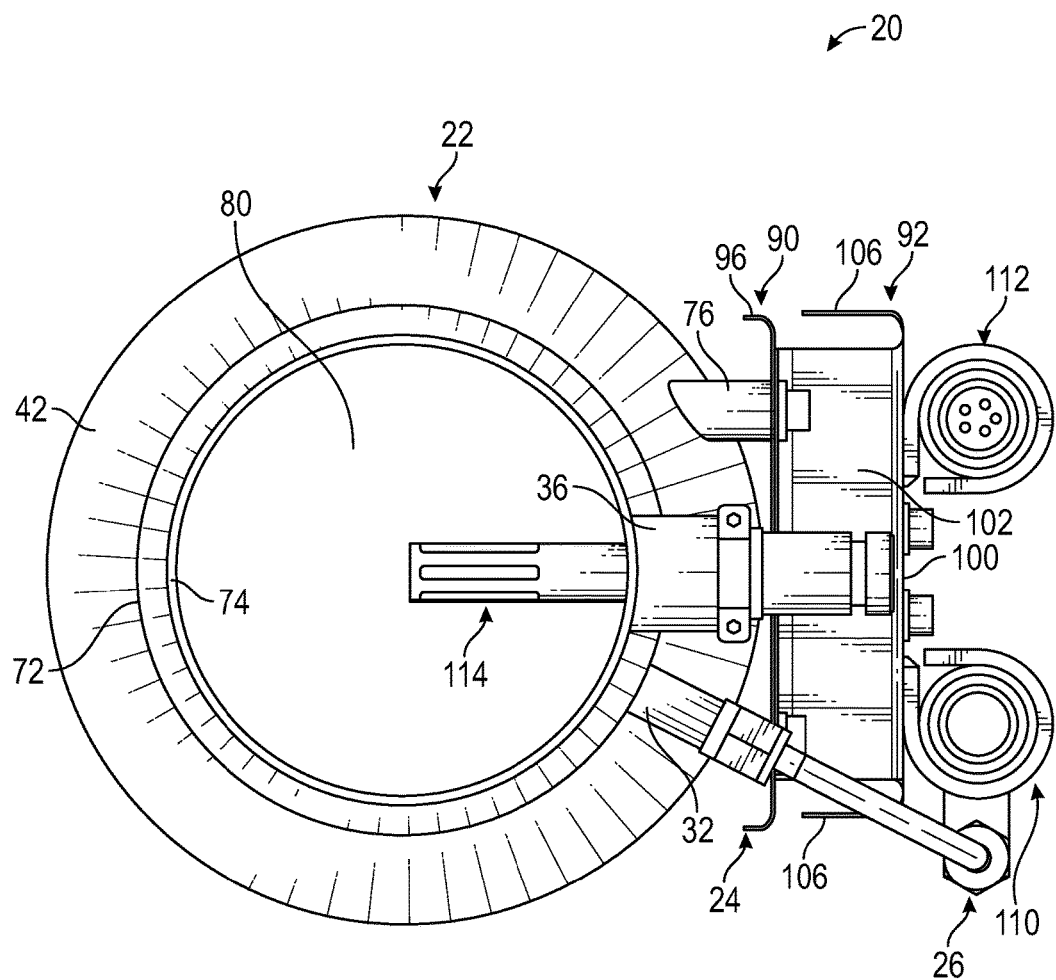
FIG. 6 is an end view of the ozone converter.

Referring to FIGS. 2-6, the mounting assembly 24 includes a heat shield 90 and a mounting bracket 92. The heat shield 90 provides thermal protection for the sensor assembly 26. The heat shield 90 is operatively connected to at least one of the inlet housing 40, outlet housing 42, and the central housing 44 via the mounting features 38, i.e. the first mounting feature 62 and the second mounting feature 76. As shown in FIGS. 2, 3, and 6, the heat shield 90 includes at least one lip 96 that extends towards the housing assembly 22.

The heat shield 90 defines openings that are configured to receive fasteners that extend into the mounting features 38. The fasteners may be configured as a bolt and washer or spacer. In at least one embodiment, the heat shield 90 is directly connected to or is wrapped about the housing assembly 22.

The heat shield 90 is disposed between the housing assembly 22 and the mounting bracket 92. The mounting bracket 92 includes a mounting bracket body 100, a first leg 102, a second leg 104, and a skirt 106. The first leg 102 and the second leg 104 extend from the mounting bracket body 100 towards the heat shield 90. The first leg 102 and the second leg 104 are disposed on the heat shield 90. The fasteners extend through the first leg 102 and the second leg 104 of the mounting bracket 92 and the heat shield 90 and into the mounting features 38. The skirt 106 extends from the mounting bracket body 100 towards the heat shield 90 but is spaced apart from and does not engage the heat shield 90.

Referring to FIGS. 2-6, the sensor assembly 26 includes a first pressure sensor 110, a second pressure sensor 112, and a temperature sensor 114. In at least one embodiment, at least a portion of the sensor assembly 26, such as the first pressure sensor 110 and the second pressure sensor 112, may be disposed upstream of the housing assembly 22 to measure an upstream pressure and another portion of the sensor assembly may be disposed downstream of the housing assembly 22 to measure a downstream pressure. In at least one embodiment, the temperature sensor 114 may be disposed upstream or downstream of the housing assembly 22. In the embodiments shown in FIGS. 2-6, the sensor assembly 26 may be removably attached to the housing assembly 22.

The first pressure sensor 110 and the second pressure sensor 112 are disposed on and are operatively connected to the mounting bracket body 100 of the mounting bracket 92. The heat shield 90 is positioned to thermally protect the circuitry of the first pressure sensor 110 and the second pressure sensor 112 from radiated or convective heat from the housing assembly 22.

The first pressure sensor 110 is fluidly connected to the first pressure port 30 and the second pressure port 32 such that the first pressure sensor 110 is configured as a differential pressure sensor. The first pressure sensor 110 is configured to monitor a pressure drop or differential pressure across the core 80 of the flow sensing ozone converter 20.

The health of the flow sensing ozone converter 20 may be determined by a control unit or a monitoring system based on the differential pressure signal provided by the first pressure sensor 110.

The second pressure sensor 112 is fluidly connected to the third pressure port 34. The second pressure sensor 112 is configured as a static pressure sensor.

The temperature sensor 114 is operatively connected to the port 36. The temperature sensor 114 extends into either the inlet 54 or the outlet 74. The temperature sensor 114 may be configured as an RTD temperature sensor. The temperature sensor 114 in conjunction with at least one of the first pressure sensor 110 and the second pressure sensor 112 aid in the measurement or monitoring of flow through or within the flow sensing ozone converter 20.

The flow sensing ozone converter 20 combines flow sensing features as well as temperature sensing features to eliminate the need for a separate flow measurement apparatus or system. Furthermore, the flow sensing ozone converter 20 provides a reduced system cost, reduce system weight, and a reduced system total installed volume as compared to other system designs.

Throughout this specification, the term "attach," "attachment," "connected", "coupled," "coupling," "mount," or "mounting" shall be interpreted to mean that a component or element is in some manner connected to or contacts another element, either directly or indirectly through at least one intervening element, or is integrally formed with the other element.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow sensing ozone converter, comprising:
an inlet housing having an inlet housing first end, an inlet having a constant diameter extending from the inlet housing first end, and an inlet housing second end, the inlet housing defining a first pressure port and varying in diameter between the inlet housing first end and the inlet housing second end;
an outlet housing having an outlet housing first end, an outlet housing second end, and an outlet extending from the outlet housing second end, the outlet housing defining a second pressure port; and
a central housing extending between the inlet housing second end and the outlet housing first end.

2. The flow sensing ozone converter of claim 1, wherein the at least one of the inlet and the outlet defines a port that is configured to receive a temperature sensor.

3. The flow sensing ozone converter of claim 1, wherein the inlet housing further defines a third pressure port that is spaced apart from the first pressure port.

4. The flow sensing ozone converter of claim 3, further comprising a first pressure sensor that is operatively connected to the first pressure port and the second pressure port.

5. The flow sensing ozone converter of claim 4, further comprising a heat shield disposed between the first pressure sensor and the central housing.

6. The flow sensing ozone converter of claim 5, wherein the heat shield is operatively connected to at least one of the inlet housing, the outlet housing, and the central housing.

7. The flow sensing ozone converter of claim 5, further comprising a second pressure sensor that is operatively connected to the third pressure port.

8. The flow sensing ozone converter of claim 7, wherein the inlet housing has a cross-sectional diameter that increases in a direction that extends from the inlet housing first end to the inlet housing second end.

9. The flow sensing ozone converter of claim 7, wherein the outlet housing has a cross-section diameter that decreases in a direction that extends from the outlet housing first end to the outlet housing second end.

10. The environment control system as recited in claim 1, further comprising a first piezometer ring disposed about the first pressure port, wherein the first piezometer ring having a diameter greater than that of the first pressure port.

11. The environment control system as recited in claim 1, further comprising a second piezometer ring disposed about the second pressure port, wherein the second piezometer ring having a diameter greater than that of the second pressure port.

12. An environmental control system, comprising:
a flow sensing ozone converter comprising:
an inlet housing having an inlet housing first end and an inlet housing second end, the inlet housing defining a first pressure port disposed proximate the inlet housing first end and defining a first mounting feature disposed proximate the inlet housing second end, the inlet housing varying in diameter between the inlet housing first end and the inlet housing second end;
an outlet housing having an outlet housing first end and an outlet housing second end, the outlet housing defining a second pressure port disposed proximate the outlet housing second end and defining a second mounting feature disposed proximate the outlet housing first end, the outlet housing varying in diameter between the outlet housing first end and the outlet housing second end; and
a central housing extending between the inlet housing second end and the outlet housing first end.

13. The environmental control system of claim 12, wherein the flow sensing ozone converter further comprises a heat shield that is operatively connected to the first mounting feature and the second mounting feature.

14. The environmental control system of claim 13, further comprising:
a mounting bracket disposed on the heat shield.

15. The environmental control system of claim 14, further comprising:
a first pressure sensor disposed on the mounting bracket and is operatively connected to the first pressure port and the second pressure port.

16. The environmental control system of claim 15, wherein an outlet of the outlet housing defines a temperature sensor port that is disposed proximate the outlet housing second end.

17. The environmental control system of claim 16, further comprising:
a temperature sensor operatively connected to the temperature sensor port.

18. The environmental control system of claim 17, wherein the inlet housing defines a third pressure port that is spaced apart from the first pressure port.

19. The environmental control system of claim 18, further comprising:
a second pressure sensor disposed on the mounting bracket and is operatively connected to the third pressure port.

20. The environmental control system of claim 19, wherein the inlet housing and the outlet housing are integrally formed with the central housing.

21. The environmental control system of claim 19, wherein the first pressure sensor is a differential pressure sensor.

22. The environmental control system of claim 19, wherein the second pressure sensor is a static pressure sensor.

* * * * *